(12) United States Patent
Lin et al.

(10) Patent No.: US 8,743,753 B2
(45) Date of Patent: Jun. 3, 2014

(54) DIGITAL SIGNAGE SYSTEM

(75) Inventors: Yung-Cheng Lin, Hsinchu (TW);
Kuo-Feng Huang, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 153 days.

(21) Appl. No.: 13/473,524

(22) Filed: May 16, 2012

(65) Prior Publication Data

US 2012/0327826 A1 Dec. 27, 2012

(30) Foreign Application Priority Data

Jun. 24, 2011 (TW) .............................. 100122128 A

(51) Int. Cl.
*H04B 7/00* (2006.01)
*H04W 4/00* (2009.01)
*H04W 88/16* (2009.01)

(52) U.S. Cl.
CPC .............. *H04W 4/001* (2013.01); *H04W 88/16* (2013.01)
USPC .......................................... 370/310; 370/389

(58) Field of Classification Search
CPC ..... H04W 84/18; H04W 88/08; H04W 84/12; H04W 80/08; H04L 45/74; H04L 49/3009; H04L 29/06095; H04L 47/2441; H04L 47/15; H04L 47/12; H04L 47/11; H04L 47/30; H04L 47/10
USPC .......................... 370/229, 230, 310, 392, 389
See application file for complete search history.

(56) References Cited

U.S. PATENT DOCUMENTS

| | | | |
|---|---|---|---|
| 8,577,739 B2 * | 11/2013 | Ansari et al. .................. | 705/26.1 |
| 2007/0083470 A1 * | 4/2007 | Bonner et al. .................. | 705/51 |
| 2008/0189774 A1 * | 8/2008 | Ansari et al. ...................... | 726/7 |
| 2011/0126276 A1 * | 5/2011 | Dykeman et al. ............... | 726/12 |

\* cited by examiner

*Primary Examiner* — Dady Chery

(57) ABSTRACT

A digital signage system, includes: a gateway device, coupled to a network; at least one first hot spot, including: an adaptor box, coupled to the gateway device, downloading a content transmitted through the network via the gateway device; a first access point device, coupled to the gateway device, downloading a service on the network via the gateway device; and a display device, coupled to the adaptor box, displaying the content through the adaptor box, and at least one second hot spot, including: a second access point device, coupled to the gateway device, downloading the service via the gateway device, wherein the first access point device and the second access point device provide the service to at least one mobile terminal through wireless communication.

14 Claims, 2 Drawing Sheets

DIGITAL SIGNAGE SYSTEM

CROSS REFERENCE TO RELATED APPLICATIONS

This application claims priority of Taiwan Patent Application No. 100122128, filed on Jun. 24, 2011, the entirety of which is incorporated by reference herein.

BACKGROUND OF THE INVENTION

1. Field of the Invention

The invention relates to a digital signage system, and more particularly to an interactive digital signage system.

2. Description of the Related Art

Digital signage, also known as a digital board, an electronic advertising billboard, multimedia signage, etc., is often set up in a department store, at a station, and around other public places so as to provide information and advertisements.

Common digital signage systems nowadays are mostly made up of liquid crystal displays or plasma displays. This kind of digital signage system can't provide interaction with viewers. Furthermore, the proprietor of the digital signage system can't get information about viewing groups and viewing frequency, and thus the advertising benefit can't be estimated.

In order to estimate the advertising benefit, some known technologies utilize cameras set up around a display, along with face recognition technology, to determine the age of viewers and to record viewing times and viewing frequencies. Information regarding the age of viewers, viewing times and viewing frequencies is used to estimate the advertising benefit of the digital signage system. Proprietors and advisement suppliers may also provide information and advertisement based on the information so as to improve the advertising benefit.

Known interactive digital signage systems mostly use integrated touch screens to interact with viewers. In one example, displays of some interactive digital signage systems are all touch screens so as to provide an interactive information inquiry service. In another example, some interactive digital signage systems have two screens. One of the screens is a screen displaying content, while the other one of the screens is a touch screen allowing users to look up further information. Nevertheless, integrated touch screens used in interactive digital signage systems provide a limited interactive service. Since interactive digital signage systems are mostly set in public places, it is inconvenient for users to enter personal information or view private content while using private services, such as ordering an advertised product. Furthermore, based on cost considerations, the number of integrated touch screens is limited. Therefore, when someone is doing operations on the touch screen, others have to wait for a while or they may just give up. However, setting up a large amount of touch screens greatly increases costs, and thus benefits are limited.

BRIEF SUMMARY OF THE INVENTION

In view of the above, the invention provides a digital signage system allowing users to interact with the digital signage system through their own mobile terminals so as to look up information, buy products, and so on. Therefore, the digital signage system provides widespread and versatile benefits without a significant increase in costs.

One embodiment of the invention provides a digital signage system, comprising: a gateway device, coupled to a network; at least one first hot spot, comprising: an adaptor box, coupled to the gateway device, downloading a content transmitted through the network via the gateway device; a first wireless access point device, coupled to the gateway device, downloading a service on the network via the gateway device; and a display device, coupled to the adaptor box, displaying the content through the adaptor box; and at least one second hot spot, comprising: a second wireless access point device, coupled to the gateway device, downloading the service via the gateway device, wherein the first wireless access point device and the second wireless access point device provide the service to at least one mobile terminal through wireless communication.

Another embodiment of the invention provides a digital signage system, comprising: a remote server, coupled to the Internet; a local server, coupled to the Internet, accessing resources of the remote server via the Internet; a gateway/switch device, coupled to the local server; and a plurality of subsystems, each comprising: a switch, coupled to the gateway/switch device; at least one first hot spot, comprising: an adaptor box, coupled to the switch, downloading a content transmitted through the network via the switch and the gateway/switch device; a first wireless access point device, coupled to the switch, downloading a service via the switch and the gateway/switch device; and a display device, coupled to the adaptor box, displaying the content through the adaptor box, and at least one second hot spot, comprising: a second wireless access point device, coupled to the switch, downloading the service via the switch and the gateway device, wherein the first wireless access point device and the second wireless access point device provide the service to at least one mobile terminal through wireless communication.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
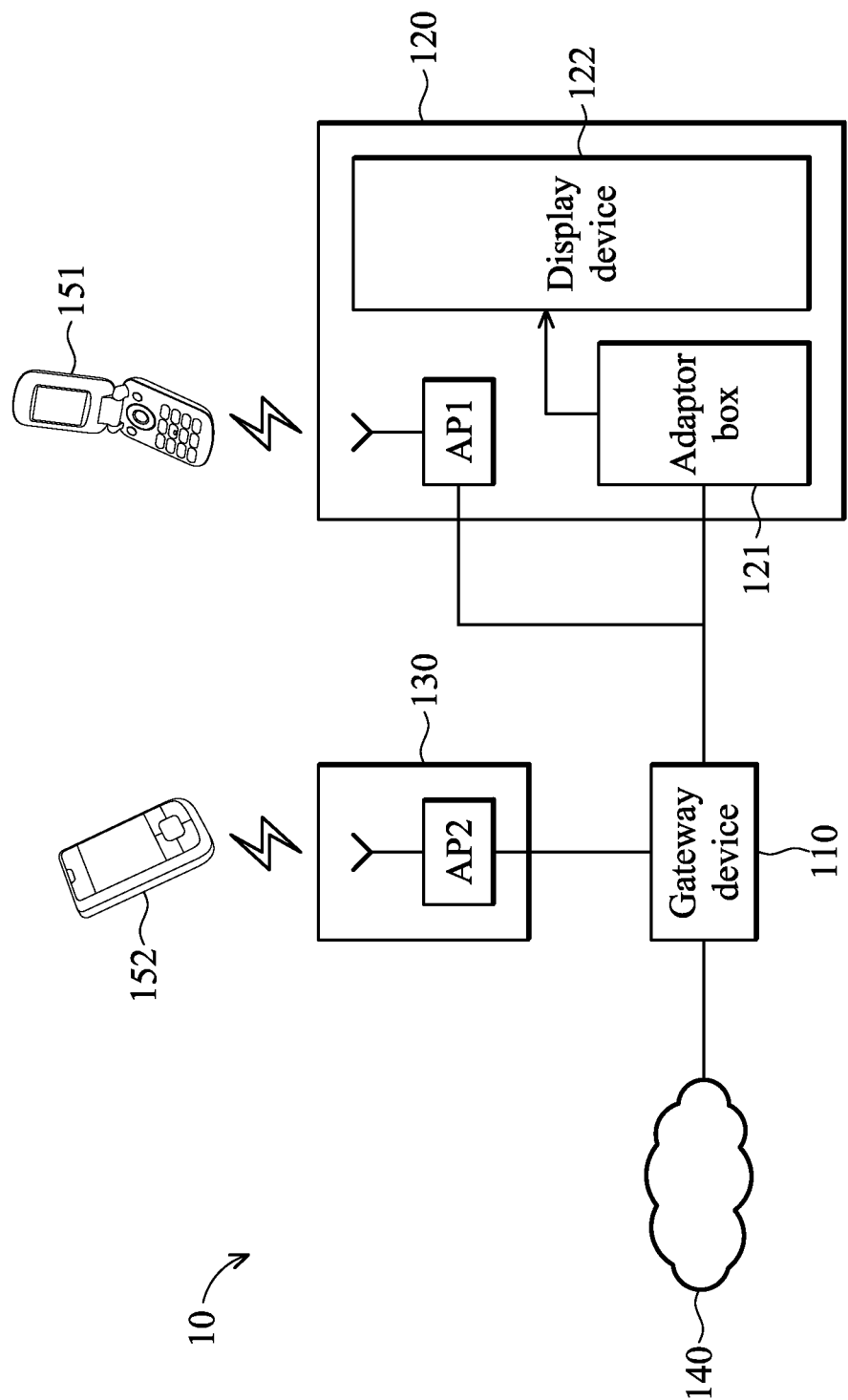
FIG. 1 illustrates a block diagram of a digital signage system in accordance with an embodiment of the invention.

FIG. 1 illustrates a block diagram of a digital signage system 10 in accordance with an embodiment of the invention. The digital signage system 10 comprises a gateway device 110, a first hot spot 120 and a second hot spot 130.

The first hot spot 120 comprises an adaptor box 121, a display device 122 and a wireless access point device AP1. The adaptor box 121 is coupled to the gateway device 110. The adaptor box downloads digital signals transmitted through a network 140 and converts the digital signals into content, such as advertisement videos and so on, to make the content be displayed on the display device 122. For example, the adaptor box 121 may be a digital video set top box. The display device 122, such as a liquid crystal display or a light emitting diode display, is coupled to the adaptor box 121. The display device 122 displays the content through the adaptor box 121. The wireless access point device AP1 is coupled to the gateway device 110 and downloads a service on the network 140 through the gateway device 110. The service comprises exploring specific pages, filling out questionnaires, making purchases, performing transactions, registering, downloading application programs, limited or unlimited access to the network, or any combinations thereof. Therefore, mobile terminals 151 and 152 (such as mobile phones, tablet computers, notebooks and so on) with wireless communication (such as Wi-Fi) ability may receive the service through the wireless access point device AP1. For example, when a user is interested in an advertisement displayed on the display device 122, the user may use a mobile terminal with wireless communication ability to communicate with the wireless access point device AP1. Therefore, the user may buy the product of the advertisement directly through the mobile terminal or explore web pages introducing further details of the product on the mobile terminal.

Compared with the first hot spot 120 having the display device 122, the second hot spot 130 comprises no display device. The second hot spot 130 comprises a wireless access point device AP2. The wireless access point device AP2 is coupled to the gateway device 110 and downloads a service on the network 140 through the gateway device 110. The service comprises exploring specific pages, filling out questionnaires, making purchases, performing transactions, registering, downloading application programs, limited or unlimited access to the network, or any combinations thereof. Therefore, mobile terminals 151 and 152 with wireless communication ability may receive the service through the wireless access point device AP2.

Wireless access point devices AP1 and AP2 and the adaptor box 121 are connected to the gateway device 110 though twisted wires, power lines, coaxial cables, optical fibers, or any combinations thereof. Therefore, places where the first hot spot 120 and the second hot spot 130 are set up may be versatile; especially places where there are only power lines, such as the inside of elevators, along pavements, in food plazas, at stations, in airports and on train cars.

FIG. 1 only illustrates one first hot spot and one second hot spot for the sake of simplicity. However, a plurality of first hot spots and a plurality of second hot spots may be included when carrying out the invention. The first hot spot 120 having the display device 122 is mainly used to attract users or show important information. The second hot spot 130 without a display device may be used to extend the service coverage of the digital signage system. The number of the first hot spot 120 and the number of the second hot spot 130 may be determined according to the type of place where the digital signage system is set up. For example, one first hot spot 120 and a plurality of second hot spots 130 may be set up in a station waiting room. Since seats in the waiting room are often arranged toward the same direction, one first hot spot 120 having the display device 122 is enough to allow most of the passengers to see and watch the display device 122. The plurality of second hot spots 130 allow passengers in the waiting room to use their mobile phones to communicate with the wireless access point device AP2 so as to receive a service, such as looking up train schedules or destination information. When the digital signage system is applied to a food plaza, the number of the first hot spot 120 is more than that of the second hot spot 130. Since there are many stores in the food plaza, one first hot spot 120 is set in front of each of the stores. The display device of the first hot spot 120 in front of each store displays the menu, pictures of meals or/and advertisements of the store to attract consumers. When consumers stand in a line and wait to order dishes, they may use their own mobile terminals to communicate with the wireless access point device AP1 of the store so as to receive service, such as reading the menu or ordering dishes online to save time.

The service that wireless access point devices AP1 and AP2 provide to mobile terminals varies according to different advertisers or proprietors. In addition to providing web pages, ordering products and performing transactions related to the advertisements, advertisers or proprietors may also collect information from users to understand the advertising benefit, such as how many people have connected to the wireless access point devices AP1 and AP2 to look up further details of the advertised product or how many people made purchase of the product through the wireless access point devices AP1 and AP2. In addition, the service comprises limited or unlimited access to the network, 140, allowing users to be able to access a network. Furthermore, the service comprises providing questionnaires, allowing advertisers or proprietors to collect information from consumers. For example, in a café, when mobile terminals are connected to wireless access point devices AP1 and AP2, a questionnaire is provided to the mobile terminals through the wireless access point devices AP1 and AP2. If a user finishes the questionnaire, the gateway device 110 provides an ID and password to the user. Therefore, the user may enter the ID and the password for authentication by the gateway device 110, so as to access the network 140.

As described above, the digital signage system 10 may provide many hot spots without setting up a large amount of displays by arranging first hot spots 120 and second hot spots 130. In addition, users may use their mobile terminals to access the Internet, perform transactions and receive other services provided by the digital signage system. Receiving a service on mobile terminals protects user privacy and thus may increase page viewing and transaction volumes. Furthermore, since devices of the digital signage system 10 may be connected through twisted wires, power lines, coaxial cables, optical fibers, or any combinations thereof, constraints on places where the digital signage system is set up may be reduced.

Figure 2:
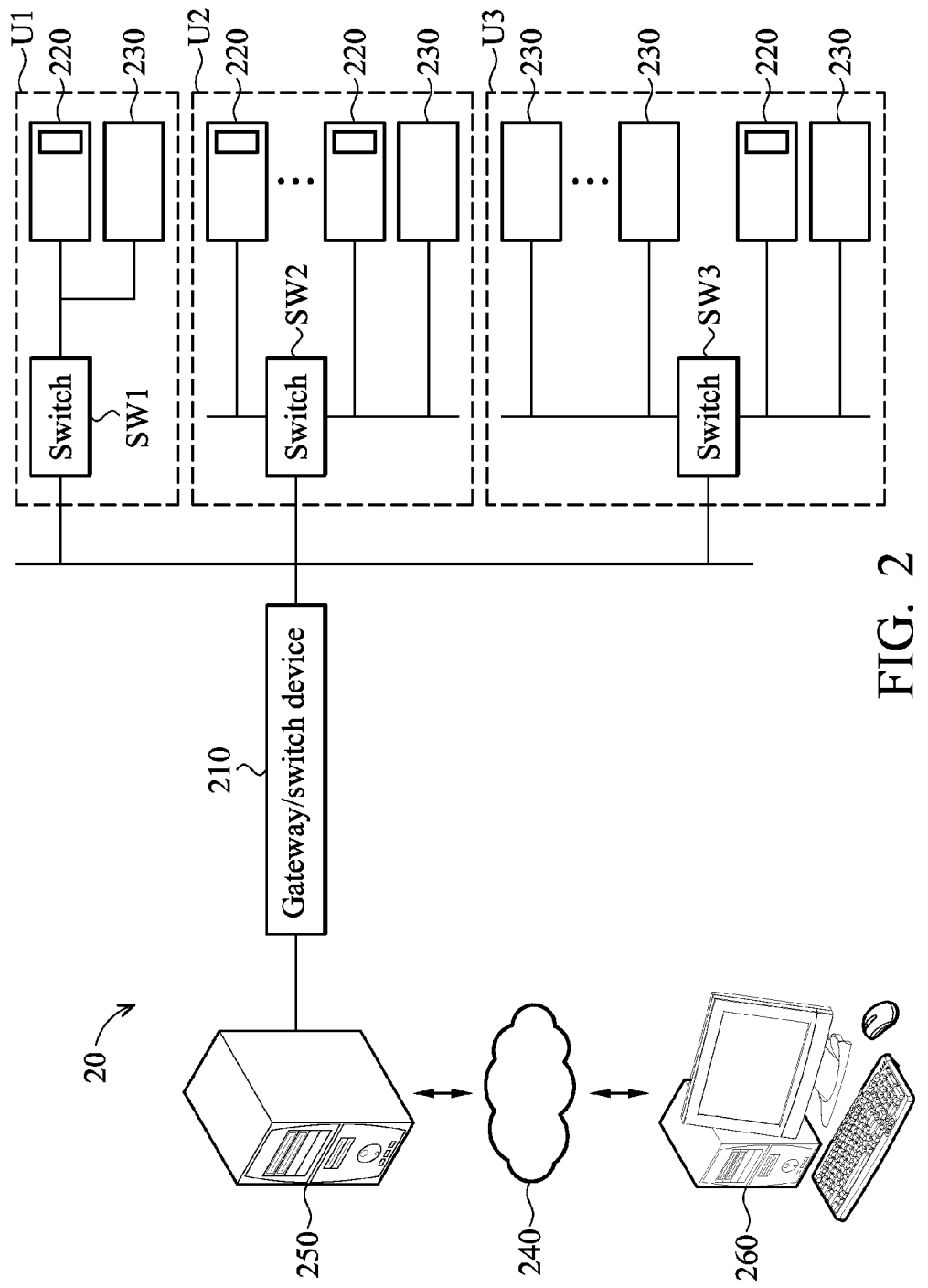
FIG. 2 illustrates a block diagram of a digital signage system in accordance with another embodiment of the invention.

FIG. 2 illustrates a block diagram of a digital signage system 20 in accordance with another embodiment of the invention. The digital signage system 20 uses a virtual local area network and quality of service (QoS) to perform data transmission of different services and control data flow.

The digital signage system 20 comprises a gateway/switch device 210, a plurality of subsystems, a local server 250 and a remote server 260. The plurality of subsystems is connected to the gateway/switch device 210. The gateway/switch device 210 is connected to the local server 250. The local server 250 is connected to the remote server through the Internet 260. For brevity, there are only three subsystems U1, U2 and U3 in FIG. 2. Each subsystem comprises a switch connected to the gateway/switch device 210, a plurality of first hot spot 220 and a plurality of second hot spot 230. For simplicity, internal structures of each first hot spot 220 and each second hot spot 230 are not shown in FIG. 2. Each first hot spot 220, the same as the first hot spot 120 in FIG. 1, comprises an adaptor box, a wireless access point device AP1 and a display device. The adaptor box is coupled to the switch of the corresponding subsystem and downloads contents via the switch and the gateway/switch device 210. The wireless access point device AP1 is coupled to the switch and downloads the service via the switch and the gateway/switch device 210. The display device is coupled to the adaptor box and displays the contents such as advertisements through the adaptor box. Each second hot spot 230, the same as the second hot spot 130 in FIG. 2, comprises a wireless access point device AP2. The wireless access point device AP2 is coupled to the switch of the corresponding subsystem and downloads the service via the switch and the gateway/switch device 210. Therefore, users may use mobile terminals with wireless communication ability (such as mobile phones, tablet computers, notebooks and so on) to communicate with the wireless access point device AP1 of the first hot spot 220 or the wireless access point device AP2 of the second hot spot 230 so as to receive the service. The service comprises exploring specific pages, filling out questionnaires, making purchases, performing transactions, registering, downloading application programs, limited or unlimited access to the Internet 240 or any combinations thereof. Mobile terminals may receive limited or unlimited access to the Internet 240 through the authentication mechanism of the gateway/switch device 210.

In each subsystem, each first hot spot 220 and each second hot spot 230 are connected to the switch of the subsystem through twisted wires, power lines, coaxial cables, optical fibers, or any combinations thereof. Switches SW1, SW2 and SW3 are coupled to the gateway/switch device 210 through twisted wires, power lines, coaxial cables, optical fibers, or any combinations thereof. Therefore, places where the first hot spot 220 and the second hot spot are set up may be versatile; especially places where there are only power lines, such as the inside of elevators, along pavements, in food plazas, at stations, in airports and on train cars.

The gateway/switch device 210 downloads content and service stored in the remote server 260 via the local server 250 and the Internet 240 to provide downloaded content and service to the subsystems. When the gateway/switch device 210 is downloading, the local server 250 stores the downloaded content and service. Thus, when the connection between the local server 250 and the remote server 260 fails, the gateway/switch device 210 can still provide the downloaded content and service stored in the local server 250 to the subsystems. The remote server 260 may be set up in places of a proprietor or operator. The remote server 260 provides content and service to the local server 250 via the Internet 240 and controls the downloading and updating of data of the local server 250. The categorization of the subsystems may be based on locations or functions. Neighboring first hot spots and second hot spots may be categorized into the same subsystem, but the invention is not limited thereto. In on embodiment, first hot spots and second hot spots in the same subsystem may have the same ID, and different subsystems have different corresponding IDs. Therefore, when a mobile terminal uses wireless communication to connect to a first hot spot or a second hot spot, the gateway/switch device 210 provides content and service corresponding to the ID of the connected first hot spot or the connected second hot spot to the mobile terminal. Therefore, the digital signage system can control what content and service are provided to first hot spots and second hot spots according to different requirements.

For example, in a department store, subsystems U1, U2 and U3 are respectively arranged on the first floor, the second floor and the third floor. The gateway/switch device 210 provides corresponding content and service to each subsystem. Thus, display devices on the first floor display shopping information of the first floor, display devices on the second floor display shopping information of the second floor and display devices on the third floor display shopping information of the third floor. In addition, when a customer is on the first floor, the subsystem U1 provides service to the customer and the customer uses his/her mobile terminal to access a web site of the first floor. When the customer walks from the first floor to the second floor, since the customer is not in the service coverage of the subsystem U1 any more, the subsystem U2 provides service to the customer instead, and thus the customer uses the mobile terminal to access a web site of the second floor.

Furthermore, the gateway/switch device 210 controls the downloading priority of first hot spots 220 and second hot spots 230 in each subsystem. In each subsystem, first hot spots with display devices download content and services first and then second hot spots without display devices subsequently download content and services. Because downloading bandwidth may be limited, the first hot spots having displays to attract customers are configured to have higher download priority than the second hot spots. When the second hot spots are downloading content and services, if the connection fails, since the first hot spots have downloaded content and services already, the second hot spots can use a synchronization mechanism from the intranet to make data of the second hot spots be synchronized with the downloaded content and services of first hot spots.

Take vehicles such as trains for example, the connection between the hot spots in a train and servers in stations may fail when the train is traveling and reconnected when the train stops by the stations. Since the first hot spots have a higher downloading priority, the first hot spots download content and services first when the train stops by stations to make sure that at least the first hot spots finish the downloading procedure. Data of the second hot spots is synchronized with downloaded data of the first hot spots and thus the second hot spots may provide content and services even though the second hot spots have yet to finish the downloading procedure when the train stops by the station.

As described above, according to the above embodiments, the invention extends the service coverage of the digital signage system and increases advertising benefit.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital signage system, comprising:
   a gateway device, coupled to a network;
   at least one first hot spot, comprising:
   an adaptor box, coupled to the gateway device, downloading a content transmitted through the network via the gateway device;
   a first wireless access point device, coupled to the gateway device, downloading a service on the network via the gateway device; and
   a display device, coupled to the adaptor box, displaying the content through the adaptor box; and
   at least one second hot spot having no display device, comprising:
   a second wireless access point device, coupled to the gateway device, downloading the service via the gateway device,
   wherein the first wireless access point device and the second wireless access point device provide the service to at least one mobile terminal through wireless communication,
   wherein the first wireless access point device has a higher priority than the second wireless access point device to download the service.

2. The digital signage system as claimed in claim 1, wherein the service comprises exploring specific pages, filling out questionnaires, making purchases, performing transactions, registering, downloading application programs, limited or unlimited access to the network, or any combinations thereof.

3. The digital signage system as claimed in claim 2, wherein the first wireless access point device, the second wireless access point device and the adaptor box are coupled to the gateway device through twisted wires, power lines, coaxial cables, optical fibers, or any combinations thereof.

4. The digital signage system as claimed in claim 1, wherein the at least one mobile terminal communicates with the first wireless access point device or the second wireless access point device through Wi-Fi technology.

5. A digital signage system, comprising:
- a remote server, coupled to the Internet;
- a local server, coupled to the Internet, accessing resources of the remote server via the Internet;
- a gateway/switch device, coupled to the local server;
- a plurality of subsystems, each comprising:
  - a switch, coupled to the gateway/switch device;
  - at least one first hot spot, comprising:
    - an adaptor box, coupled to the switch, downloading a content transmitted through the network via the switch and the gateway/switch device;
    - a first wireless access point device, coupled to the switch, downloading a service via the switch and the gateway/switch device; and
    - a display device, coupled to the adaptor box, displaying the content through the adaptor box; and
  - at least one second hot spot having no display device, comprising:
    - a second wireless access point device, coupled to the switch, downloading the service via the switch and the gateway device,
- wherein the first wireless access point device and the second wireless access point device provide the service to at least one mobile terminal through wireless communication,
- wherein the first wireless access point device has a higher priority than the second wireless access point device to download the service.

6. The digital signage system as claimed in claim 5, wherein the service comprises exploring specific pages, filling out questionnaires, making purchases, performing transactions, registering, downloading application programs, limited or unlimited access to the network, or any combinations thereof.

7. The digital signage system as claimed in claim 6, wherein the first wireless access point device, the second wireless access point device and the adaptor box are coupled to the switch through twisted wires, power lines, coaxial cables, optical fibers, or any combinations thereof.

8. The digital signage system as claimed in claim 7, wherein the switch is coupled to the gateway/switch device through twisted wires, power lines, coaxial cables, optical fibers, or any combinations thereof.

9. The digital signage system as claimed in claim 8, wherein the gateway/switch device controls data transmission of the plurality of subsystems to allow each of the subsystems to download the content and the service corresponding to each of the subsystems.

10. The digital signage system as claimed in claim 9, wherein the adaptor box downloads the content transmitted through the Internet via the switch and the gateway/switch device, and the first wireless access point device and the second wireless access point device download the service transmitted through the Internet via the switch and the gateway/switch device.

11. The digital signage system as claimed in claim 9, wherein the local server downloads the content and the service provided by the remote server through the Internet, and the adaptor box downloads the content stored in the local server via the switch and the gateway/switch device, and the first wireless access point device and second wireless access point device download the service stored in the local server via the switch and the gateway/switch device.

12. The digital signage system as claimed in claim 5, wherein the at least one mobile terminal communicates with the first wireless access point device or the second wireless access point device through Wi-Fi technology.

13. The digital signage system as claimed in claim 5, wherein the service of the second wireless access point device is synchronized with the downloaded service of the first wireless access point device.

14. The digital signage system as claimed in claim 5, wherein the service of the second wireless access point device is synchronized with the downloaded service of the first wireless access point device.

* * * * *